Figure 1:
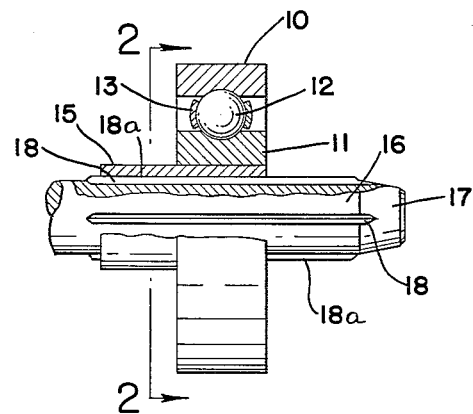

Sept. 11, 1962  F. Z. DAUGHERTY  3,052,956
METHOD AND ASSEMBLY FOR ANTI-FRICTION
BEARING MOUNTING STRUCTURE
Filed March 28, 1960

INVENTOR.
FRANK Z. DAUGHERTY
BY
Williams Tilberry & Gohrick
ATTORNEYS

3,052,956
METHOD AND ASSEMBLY FOR ANTI-FRICTION BEARING MOUNTING STRUCTURE

Frank Z. Daugherty, Kent, Ohio, assignor to Ametek, Inc., a corporation of Delaware
Filed Mar. 28, 1960, Ser. No. 18,114
2 Claims. (Cl. 29—148.4)

The present invention is concerned generally with a method and structure for securing on a shaft and anti-friction bearing assembly or unit, of quite precise form and tolerances relative to the shaft finish and tolerances. More particularly the invention is concerned with a structure and method whereby a relatively precise bearing unit may be fitted and secured on a shaft which is relatively coarse in its finish or dimensioning without distortion of the bearing to any unacceptable degree.

Often anti-friction bearing assemblies, such as ball bearing or roller bearing units or the like having a fair degree of precision, are to be fitted on or be secured to a shaft element having a relatively coarse ground surface. Though the shaft may be perhaps out of round in what appears to be a relatively small degree, when press-fitted directly into the inner race of the roller bearing with a fit of such nature as will serve to retain the bearing in desired axial position relative thereto, it may so distort the inner race as to cause a noisy bearing operation, bearing wear, and generally faulty bearing performance.

The object of the present invention is to provide a method and structure whereby a relatively coarse ground or coarse-finished shaft may have secured thereon by press-fitting operations or the like a relatively precise bearing unit without objectable distortion of the bearing unit or the inner race leading to such aforesaid undesirable results. With the present invention this is achieved by relatively simple expedients of structure and fabrication. Considering as a typical case a coarse-ground or coarse-finished shaft, the shaft—preferably having a slight end taper—is provided with a plurality of equally circumferentially spaced longitudinal grooves by operation of a pointed scoring tool which in forming a groove raises along each side thereof longitudinal spline-like burrs, projecting slightly above the adjacent unworked surface of the shaft. A sleeve, of material relatively soft in comparison with the usually steel shaft and inner race, is interposed between shaft and race. A shaped powdered metal sleeve of sintered bronze or other like material, softer than the shaft and inner race elements is suited for the intended purpose; it being required that such material be non-flowing over an extended time, adapted to attain a frictional engagement holding the elements in properly established relation, and yet to assume local deformation by certain parts of the shaft without applying objectionable localized stresses on corresponding parts of the race circumference. In the preferred method of assembly the sleeve is press fitted into the inner race and thereafter the bearing unit sleeve sub-assembly is pressed onto the shaft from the tapered end.

Figure 2:
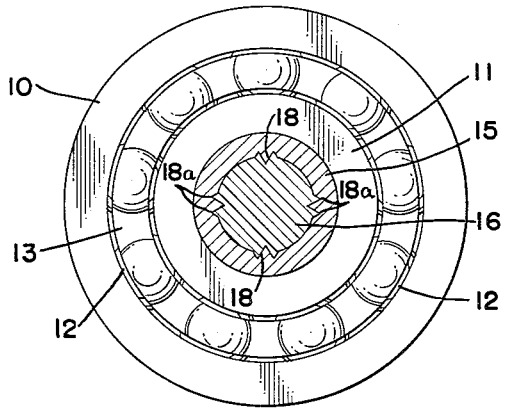

The purpose and effect of the interposed sleeve is to "absorb" the out-of-roundness or other irregularity of the rough-finished shaft while the "splines" or burrs then firmly engage the sleeve and thereby the inner race against rotation, and also serve to expand the sleeve in suitable fashion with substantially equal pressure on the inner surface of the inner race. It has been found that by this expedient relatively coarse-finished shafts may have precision bearings mounted thereon without impairing bearing performance, thereby avoiding the necessity of and attendant cost of any type of correlative precision finsh even on the shaft areas intended to receive the bearing inner race. A specific embodiment of the invention is disclosed in the following description and the drawings wherein:

FIG. 1 is a side elevation of a roller bearing unit and a fragmentarily represented shaft, with a portion of the bearing unit and of the shaft broken away for clarity; and FIG. 2 is a radial section taken as indicated by the line 2—2 in FIG. 1.

In the drawings there is shown a conventional ball bearing unit comprised of outer race 10 and inner race 11 with interposed bearing balls 12 held in properly spaced relation by the usual bearing cage 13. The sleeve 15 interposed between the inner race 11 and shaft 16 is formed of material softer than the shaft and race; e.g., with steel shaft and race, formed of sintered bronze, copper or other like material. The shaft 16 has a tapered free end 17, on the order of a 10° taper for receiving thereon a sub-assembly comprised of the bearing unit with the sleeve previously press-fitted into the inner race thereof. The shaft has a plurality of equally circumferentially spaced longitudinal grooves 18, here four in number, along the respective sides of each of which are raised a pair of parallel longitudinal burrs, ridges or spline-like structures 18a, 18a, resulting by passing a pointed tool along the shaft to form the groove. By pressing the sleeve first into the inner race, the general contact area of sleeve and race is established to accommodate the softer sleeve to the inner race. This is of course done with tooling or jigging adapted to provide coaxial relation of the outer and inner surfaces respectively of sleeve and inner race. Into the resulting sub-assembly the tapered end of the described grooved shaft is then pressed to achieve the required axial positioning of the bearing unit on the shaft.

As an example of the application of this invention for an "8 mm." ball bearing unit (approximately 0.273 inch long, 0.886 inch O.D. for outer race and conforming to A.B.E.C—1 tolerances) with inner race internal diameter of 0.3147 to 0.3150 inch, a powdered bronze sleeve having an outside diameter of 0.3155 to 0.3165 inch and an inside diameter reamed to 0.2385 to 0.2425 inch diameter (the stated diameters being concentric within 0.001 in T.I.R.) can be pressed into the inner race for reception of a shaft ground to a diameter of 0.2490 to 0.2495 inch. The shaft is grooved at four equi-spaced locations in the manner described to result in groove-adjacent longitudinal ribs or burrs of the stated character having a diametric outside dimension for opposite burr formations of 0.255 to 0.257 inch. A 6° included angle is used in the tapered end. These relative tolerances and sizes are acceptable for mass production of fractional horsepower electric motors including such bearing mounting.

I claim:

1. A method of assemblying a precision anti-friction bearing unit on a relatively rough finished portion of a shaft, comprising: grooving said portion of the shaft by passing a pointed tool longitudinally therealong at circumferentially equi-spaced locations and thereby raising a longitudinal ridge on each side of each groove; forming a sleeve from metal softer than said shaft and the inner race of said bearing and having an outside diameter at least as great as the inside diameter of the inner race and with an inside diameter less than the normal outside diameter of said shaft portion; inserting the sleeve into the inner race; and press-fitting said shaft portion into the said sleeve after insertion of the sleeve in said race.

2. A method as in claim 1, wherein said shaft is provided with a tapered end before press-fitting into said sleeve.

References Cited in the file of this patent

UNITED STATES PATENTS

| | | |
|---|---|---|
| 1,157,666 | Bennett | Oct. 26, 1915 |
| 1,993,519 | Miltenberger | June 1, 1933 |
| 2,620,243 | Beatty | Dec. 2, 1952 |